United States Patent [19]
Gottfried

[11] Patent Number: 6,048,805
[45] Date of Patent: Apr. 11, 2000

[54] FIRE, HEAT AND BACKDRAFT PROTECTION SHIELD FOR FIREFIGHTERS

[75] Inventor: Samuel Gottfried, Riverdale, N.Y.

[73] Assignee: No Fire Technologies Inc., Upper Saddle River, N.J.

[21] Appl. No.: 09/167,447

[22] Filed: Oct. 6, 1998

Related U.S. Application Data

[63] Continuation-in-part of application No. 08/862,833, May 23, 1997.

[51] Int. Cl.[7] .................. B32B 3/28; A62C 8/00
[52] U.S. Cl. .............. 442/138; 428/34.5; 428/34.6; 428/35.9; 428/36.91; 428/921; 442/59; 169/48
[58] Field of Search .................. 428/34.5, 34.6, 428/35.9, 36.91, 921; 442/138; 169/48

[56] References Cited

U.S. PATENT DOCUMENTS

| | | | |
|---|---|---|---|
| 3,934,066 | 1/1976 | Murch | 428/248 |
| 5,658,634 | 8/1997 | Ragland et al. | 428/75 |
| 5,681,640 | 10/1997 | Kiser | 428/181 |
| 5,723,515 | 3/1998 | Gottfried | 523/179 |

*Primary Examiner*—Terrel Morris
*Assistant Examiner*—Ula Ruddock
*Attorney, Agent, or Firm*—Ezra Sutton

[57] ABSTRACT

A fire, heat and backdraft protection system is described for protecting firefighters in all types of fires. The protection system includes a composite laminate structure having a plurality of layers for the protection of firefighters who are exposed to high temperatures of 2200° F. for 30 minutes in duration. The plurality of layers includes an outer first layer, an inner second layer and an inner third layer. The outer first layer is a fiberglass textile having an intumescent coating resistant to heat, water and impact. The inner second layer is a metal foil layer for reflecting heat and eliminates the convection transfer of heat. The inner third layer is a low conductivity refractory blanket for reducing the transmission of heat. The inner fourth layer is a metal foil layer for reflecting heat and eliminates the convection transfer of heat.

57 Claims, 15 Drawing Sheets

FIRE, HEAT AND BACKDRAFT PROTECTION SHIELD FOR FIREFIGHTERS

RELATED APPLICATION

This application is a continuation-in-part of application Ser. No. 08/862,833 filed on May 23, 1997.

FIELD OF THE INVENTION

The present invention relates to a fire, heat and backdraft protection shield for fire fighters. More particularly, this new protection shield includes a composite laminate structure having a plurality of layers for the protection of firefighters where there is exposure to fire, high temperatures or potential backdrafts for up to 30 minutes in duration and for exposure to temperatures of 2200° F.

BACKGROUND OF THE INVENTION

Fire and heat protection for firefighters has been provided by a wide variety of protective garments. This protection is useful for very short duration and relatively low temperatures.

These types of garments and protective gear have one or more of the following disadvantages associated with their use:

1. Expensive materials.
2. Protection is adequate for low temperatures.
3. Protection is adequate for very short duration.
4. No protection for backdraft conditions.

In many situations where there is a fire in an edifice such as a single family home, or office building or factory, there is a potential for very high temperatures, in excess of 1500° F., or room flashovers, or backdrafts. These conditions provide a high potential for loss of life for any firefighter in the vicinity.

Currently, there is no fire or backdraft protection having all of the following desirable features:

1. Low cost of materials.
2. Light weight and easily portable.
3. Provides protection up to 30 minutes.
4. Provides protection for fire and backdraft/flashovers up to temperatures of 2200° F.

There remains a need for a fire, heat and backdraft protection shield that would provide substantial protection for a firefighter for long duration and at high temperatures if a flashover or backdraft condition occurred. In addition the shield should be lightweight, easily handleable and portable.

DESCRIPTION OF THE PRIOR ART

Fire and thermal protection panels, mats and protective garments for fire and heat protection of various designs, configurations, structures and materials of construction have been disclosed in the prior art. For example, U.S. Pat. No. 5,460,864 to HEITKAMP discloses a composite sandwich panel structure having first and second honeycomb core layers and fire barrier membranes separating the honeycomb layers. This composite sandwich panel is designed to be used in environments requiring fire or flame resistance, or fire protection. This prior art patent does not disclose the particular structure and design nor the intended use of a fire protection shield of the present invention for firefighting protection of the user.

U.S. Pat. No. 5,434,006 to GOELFF et al discloses a fire-resistant panel comprising at least one layer of intumescent material bonded to at least one structural ply of the panel. This fire-resistant and transparent glazing panel is used between two glass sheets for a room where there may be a risk of fire. This prior art patent does not disclose the particular structure and design nor the intended use of a fire protection device of the present invention for firefighting protection of the user.

U.S. Pat. No. 5,792,542 to MORGAN discloses a fire retarding fluid mat formed of two layers of material sealed around the edges, for use as a protective cover for retarding burning materials that contact the mat. This prior art patent does not disclose the particular structure and design nor the intended use of a fire protection shield of the present invention for firefighting protection of the user.

U.S. Pat. Nos. 4,184,212; 5,014,357 and 5,720,045 disclose fire resistant protective garments and headgear having laminated layers of fire retardant materials. These prior art patents do not disclose the particular structure and design nor the intended use of a fire protection shield of the present invention for firefighting protection of the user.

None of the aforementioned prior art patents disclose a layered composite laminate structure of a fire, heat and backdraft protection shield of the present invention for use in firefighting.

Accordingly, it is an object of the present invention to provide a fire, heat and backdraft protection shield that is effective at continuously maintained temperatures of up to 2200° F. and for up to 30 minutes in duration.

Another object of the present invention is to provide a fire, heat and backdraft protection shield that is thin and light weight, and can be easily transported by a firefighter during a fire in an edifice, such as a single family house, a store, office building, apartment buildings, factory and the like.

Another object of the present invention is to provide a fire, heat and backdraft protection shield that is thin and light weight and can be used by a firefighter when it is necessary to approach a fire outdoors, such as an automobile or truck fire, an oil pipeline or gas fire, or the like when there is extreme danger in approaching uncontrollable flames.

Another object of the present invention is to provide a fire, heat and backdraft protection shield that has multiple facility applications for operational use that includes: residential, business, commercial, land based, off shore and marine environments, oil, gas and chemical pipelines, military installations, airports and the like.

Another object of the present invention is to provide a fire, heat and backdraft protection shield that provides protection using a novel combination of radiation and heat reflection with low thermal conduction.

Another object of the present invention is to provide a fire, heat and backdraft protection shield that provides protection that is low cost, portable and disposable after use.

Another object of the present invention is to provide a fire, heat and backdraft protection shield that provides protection that uses safe, non-toxic, non-hazardous, environmentally safe materials and emits low smoke and non-hazardous products of combustion.

Another object of the present invention is to provide a fire, heat and backdraft protection shield that includes a composite laminate structure having a plurality of layers for the protection of a firefighter.

Another object of the present invention is to provide a fire, heat and backdraft protection shield having a plurality of layers including a heat reflection outer shell, a first metal foil layer, a low thermal conductive layer and a second metal foil layer to protect the firefighter.

Another object of the present invention is to provide a fire, heat and backdraft protection shield having a plurality of layers including a heat reflection outer shell, a metal foil layer, and a low thermal conductive layer to protect the firefighter.

Another object of the present invention is to provide a fire, heat and backdraft protection shield that can be mass-produced in an automated and economical manner, and is cost efficient for a variety of applications.

SUMMARY OF THE INVENTION

In accordance with the present invention, there is provided a fire, heat and backdraft protection shield to protect firefighters in a burning edifice or in the approach to a fire condition. The fire, heat and backdraft protection shield includes a laminate structure having a plurality of layers for the protection of the firefighter who is exposed to fire or high temperature for up to 30 minutes in duration at temperatures up to 2200° F.

The plurality of layers includes an outer first layer, an inner second layer, an inner third layer and inner fourth layer for protecting the firefighter. The outer first layer is a fiberglass textile having an intumescent coating for resistance to heat, water and impact and the outer first layer contacts the inner second layer and has an inner surface wall in contact with the inner second layer.

The inner second layer is a metal foil layer for reflecting heat and eliminating the convective transfer of heat, and the inner second layer contacts the inner third layer, and has an inner surface wall in contact with the inner third layer.

The inner third layer has a low conductivity refractory blanket for reducing the transmission of heat, and the inner third layer contacts the inner fourth layer and has an inner surface wall in contact with the inner fourth layer.

The inner fourth layer is a metal foil layer for reflecting heat and eliminating the convective transfer of heat, and the inner fourth layer contacts the metal frame, and has an inner surface wall in contact with the metal frame and the rear inner surface wall of the inner fourth layer which protects the firefighter.

BRIEF DESCRIPTION OF THE DRAWINGS

Further objects, features and advantages of the present invention will become apparent upon consideration of the detailed description of the presently preferred embodiments, when taken in conjunction with accompanying drawings herein.

DETAILED DESCRIPTION OF THE PREFERRED AND ALTERNATE EMBODIMENT

OVERVIEW

Figure 4:
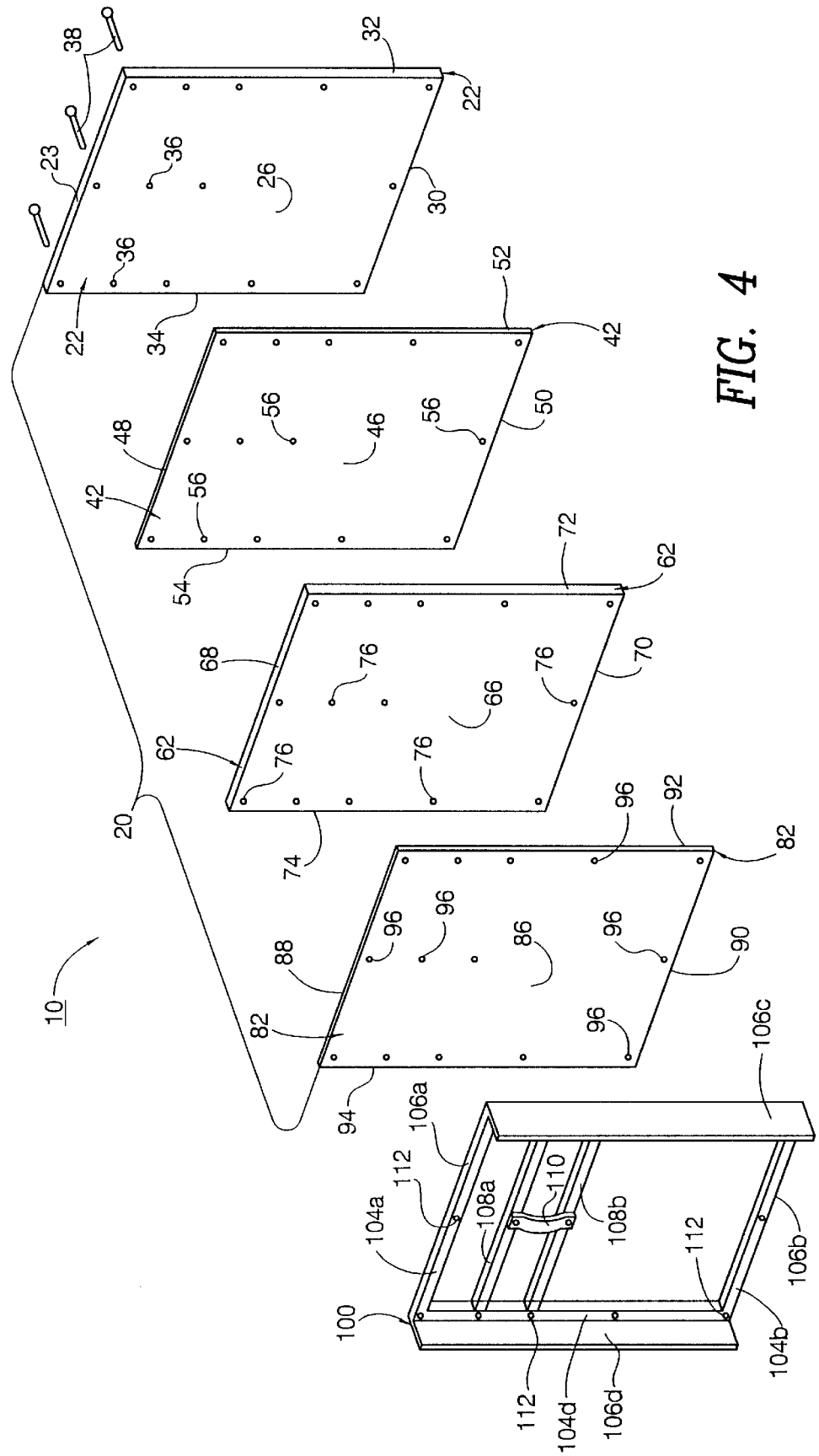
FIG. 4 is an exploded rear perspective view of the fire, heat and backdraft protection shield of the present invention showing the four-ply layers of the composite laminate structure in an unassembled state being readied for attachment to the attachment frame member via rivets.
Figure 5:
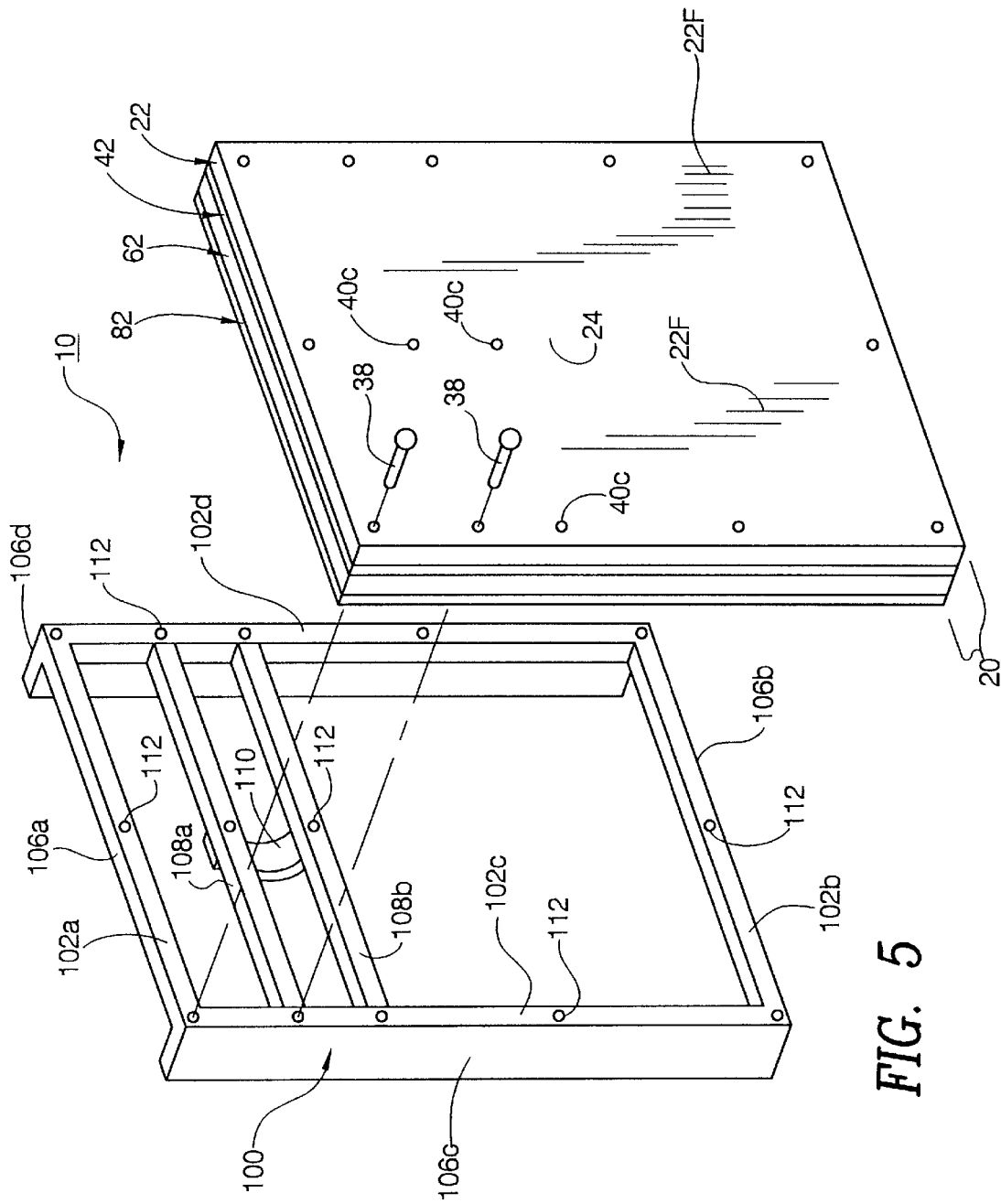
FIG. 5 is an exploded front perspective view of the fire, heat and backdraft protection shield of the present invention showing the four-ply layered composite laminate structure in an unassembled state being attached to the attachment frame member via rivets.
Figure 6:
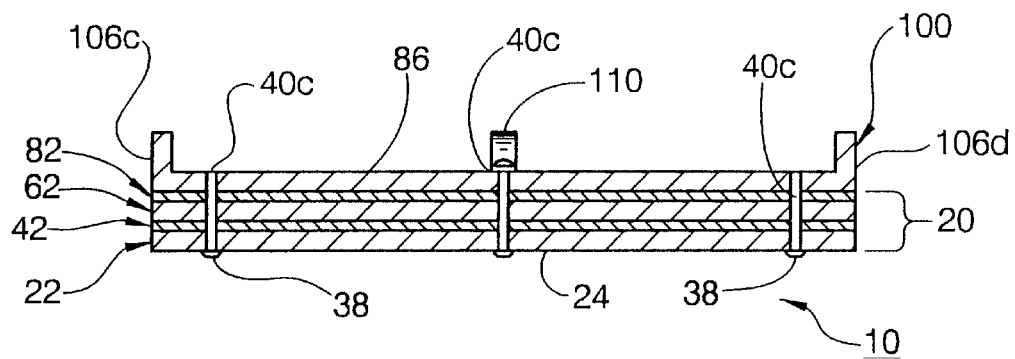
FIG. 6 is a top cross-sectional view of the fire, heat and backdraft protection shield of the present invention taken along lines 6—6 of FIG. 1 showing the composite laminate structure attached to the attachment frame member in the final assembling of the protection shield for operational use.
Figure 13:
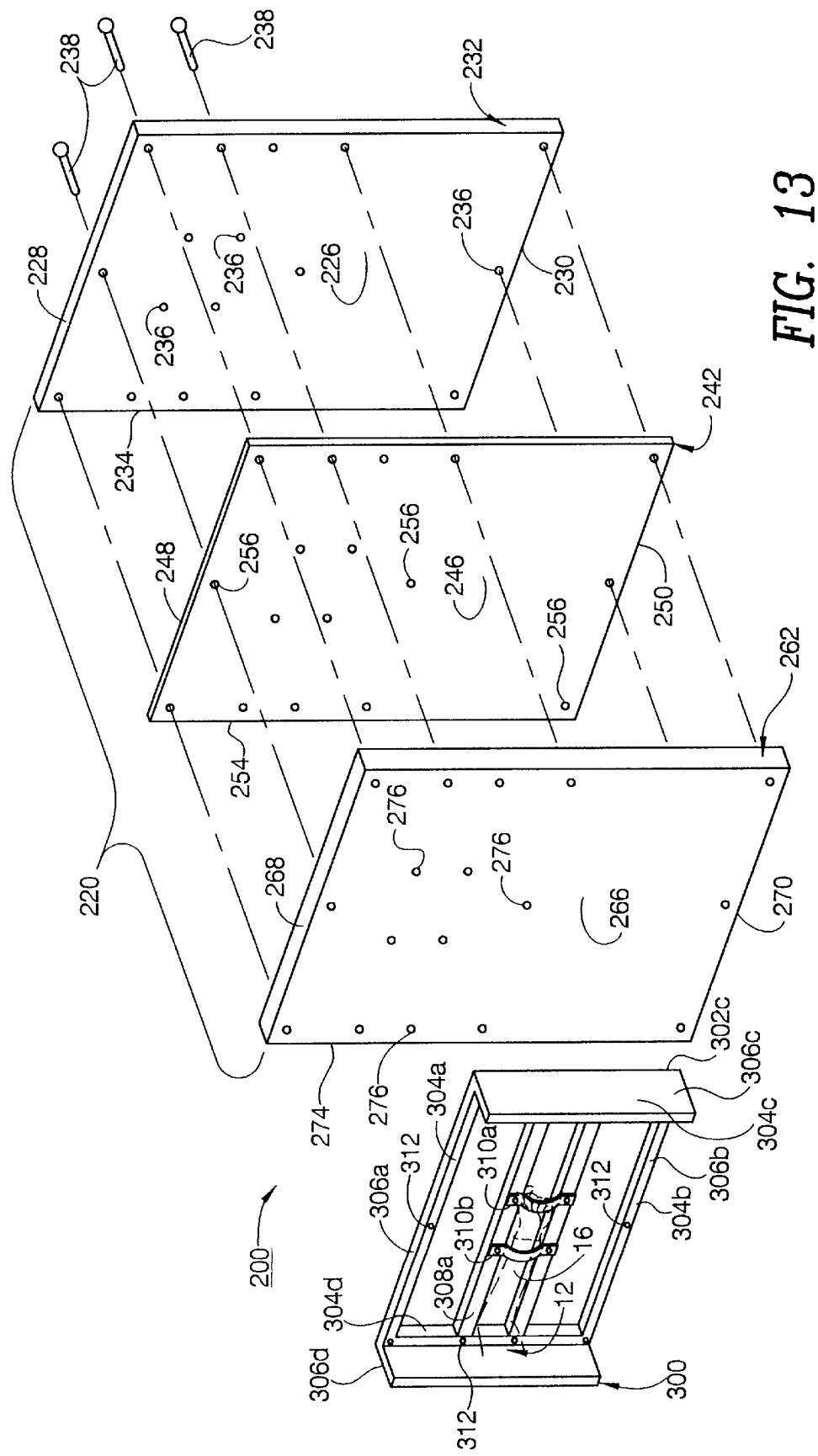
FIG. 13 is an exploded rear perspective view of the fire, heat and backdraft protection shield of the present invention showing the three-ply layers of the composite laminate structure in an unassembled state being readied for attachment to the attachment frame member via rivets.
Figure 14:
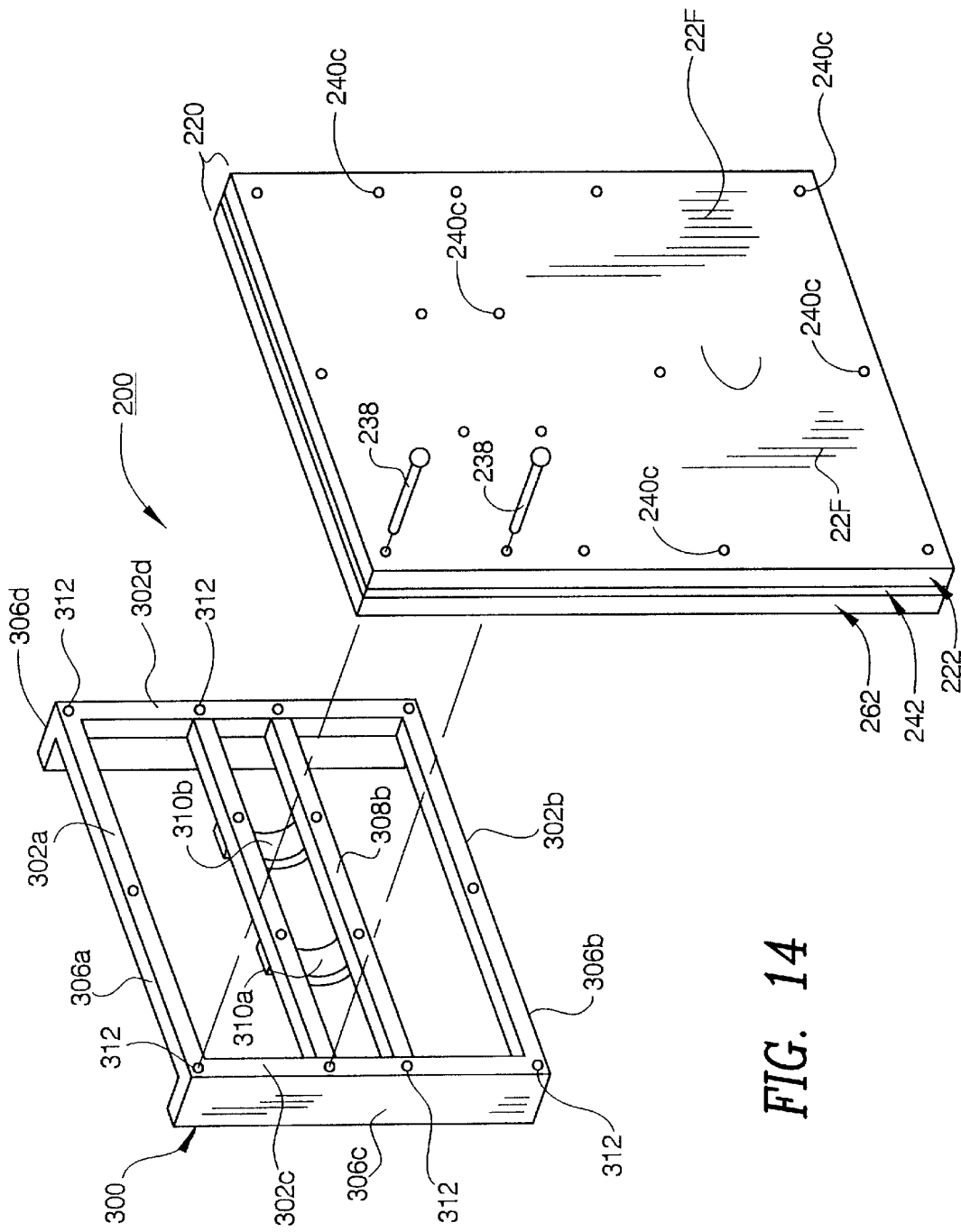
FIG. 14 is an exploded front perspective view of the fire, heat and backdraft protection shield of the present invention showing the three-ply layered composite laminate structure in an unassembled state being attached to the attachment frame member via rivets.
Figure 17:
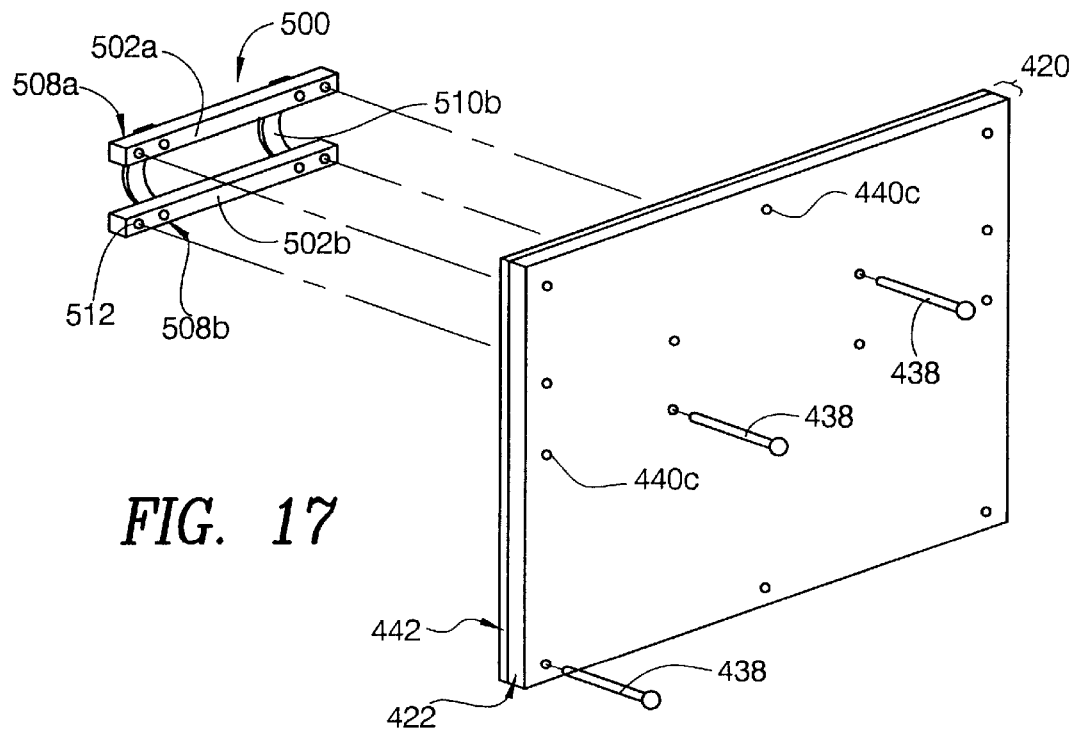
FIG. 17 is an exploded front perspective view of the fire, heat and backdraft protection shield of the second alternate embodiment of the present invention showing the two-ply layered composite laminate structure in an unassembled state being attached to the handle assembly via rivets.
Figure 18:
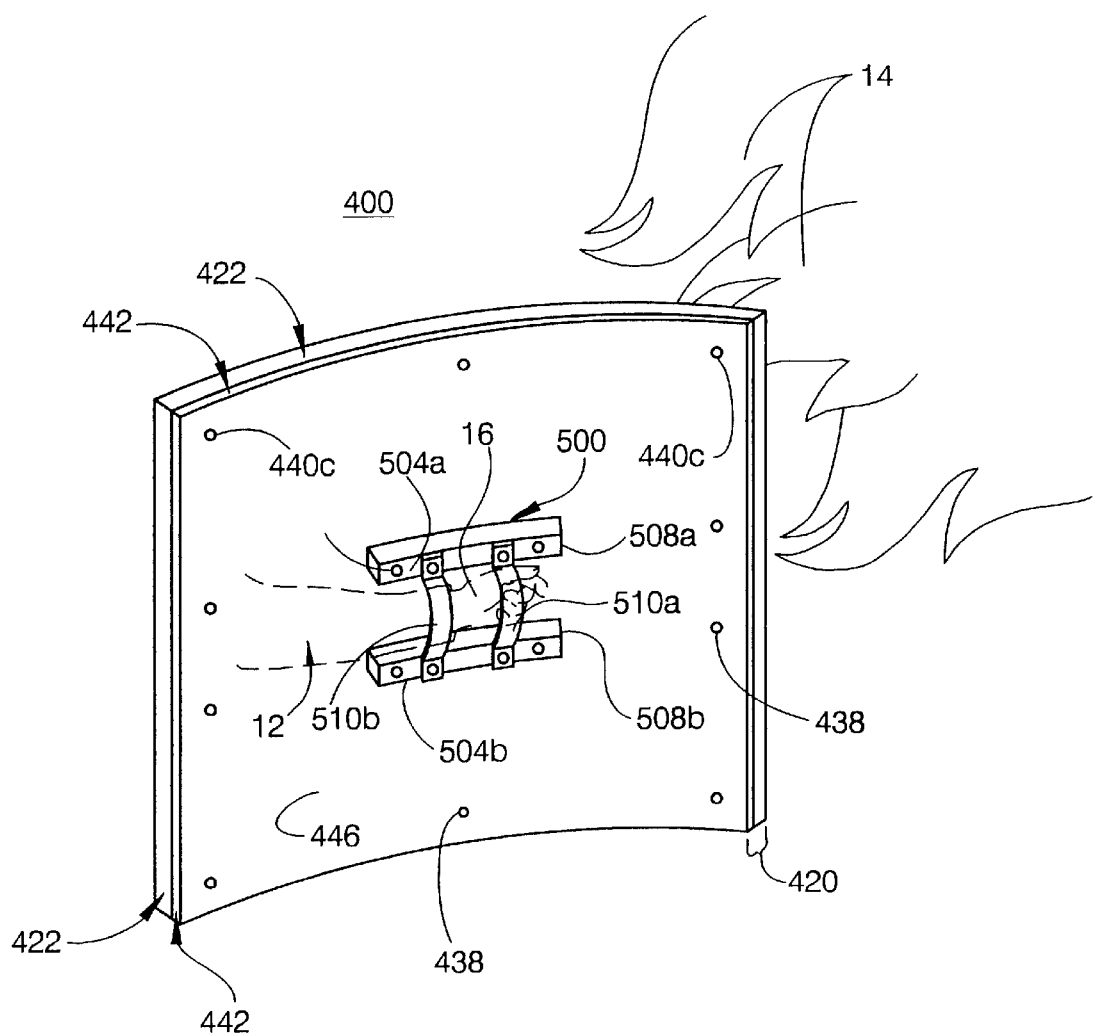
FIG. 18 is a rear perspective view of the fire, heat and backdraft protection shield of the second alternate embodiment of the present invention showing the two-ply layered composite laminate structure having a curved (convex) surface in an assembled state.

The fire, heat and backdraft protection shield of the preferred embodiment 10 and the first and second alternate embodiments 200 and 400 of the present invention are represented in detail by FIGS. 1 through 17 of the drawings. The heat protection shield 10, 200 and 400 of the preferred and alternate embodiments, as shown in FIGS. 1, 2, 8, 9 and 15, are used by firefighters 12 in protecting the user where there is exposure to fire 14, high temperatures (heat), and potential flashovers/backdrafts up to 2200° F. for up to 30 minutes in duration. The protection shield 10, 200 or 400 includes a composite laminate structure 20, 220 or 420 having a plurality of layers for the protection of firefighters where there is exposure to fire, high temperatures or potential flashovers/backdrafts at residential, commercial, industrial, chemical or oil facility fires. Composite laminate structures 20, 220 or 420 can be laminated such that their overall configuration is a flat linear rectangular structure, as depicted in FIGS. 5, 14 and 17, respectively, or can be laminated such that their overall configuration has a curved surface (convex along the horizontal axis), as shown in FIG. 18 of the drawings.

Figure 2:
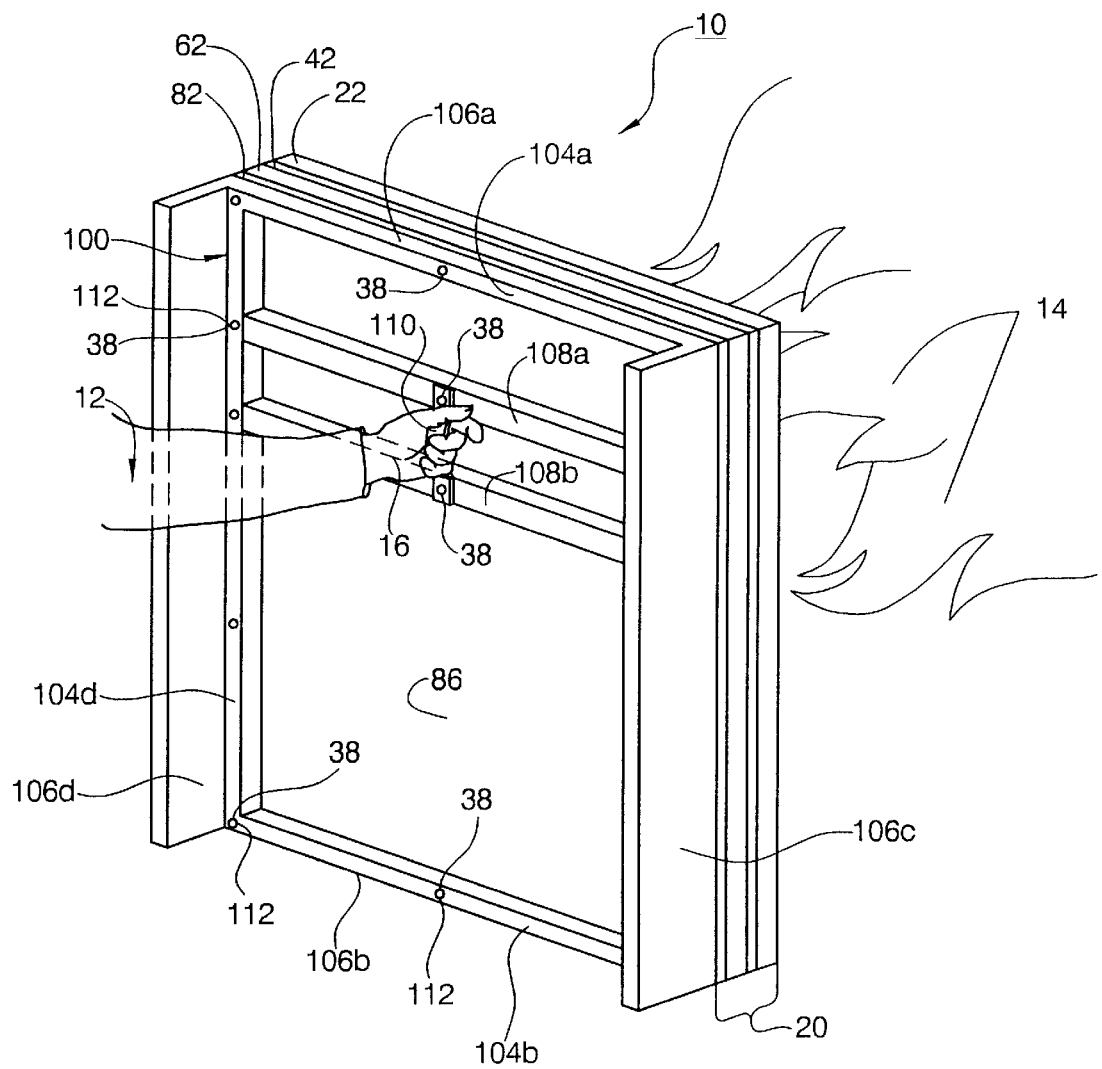
FIG. 2 is a rear perspective view of the fire, heat and backdraft protection shield of the preferred embodiment of the present invention showing the composite laminate structure in the assembled state having the outer first layer, the inner second layer, the inner third layer, the inner fourth layer and the attachment frame member thereon, and in operational use.

The plurality of layers 20 for the preferred embodiment 10 includes an outer first layer 22, a second layer 42, a third layer 62 and an inner fourth layer 82 for the protection of firefighters 12 when in use. The outer first layer 22 is a fiberglass textile 22F having an intumescent coating for resistance to water, fire, heat, impact and backdrafts. The second layer 42 is a metal foil layer for reflecting heat and eliminating the convection transfer of heat. The third layer 62 is a low thermal conductivity refractory blanket for reducing the transmission of heat. The inner fourth layer 82 is a metal foil layer for reflecting heat and eliminating the convection transfer of heat. Additionally, the fire protection shield 10 includes an attachment frame member 100 with a handle component 110 for holding the plurality of layers 20 together via rivets 38. The attachment frame member 100 is used for holding and attaching the four-ply layered composite laminate structure 20, thereon via rivets 38, as shown in FIG. 2 of the drawings.

Figure 9:
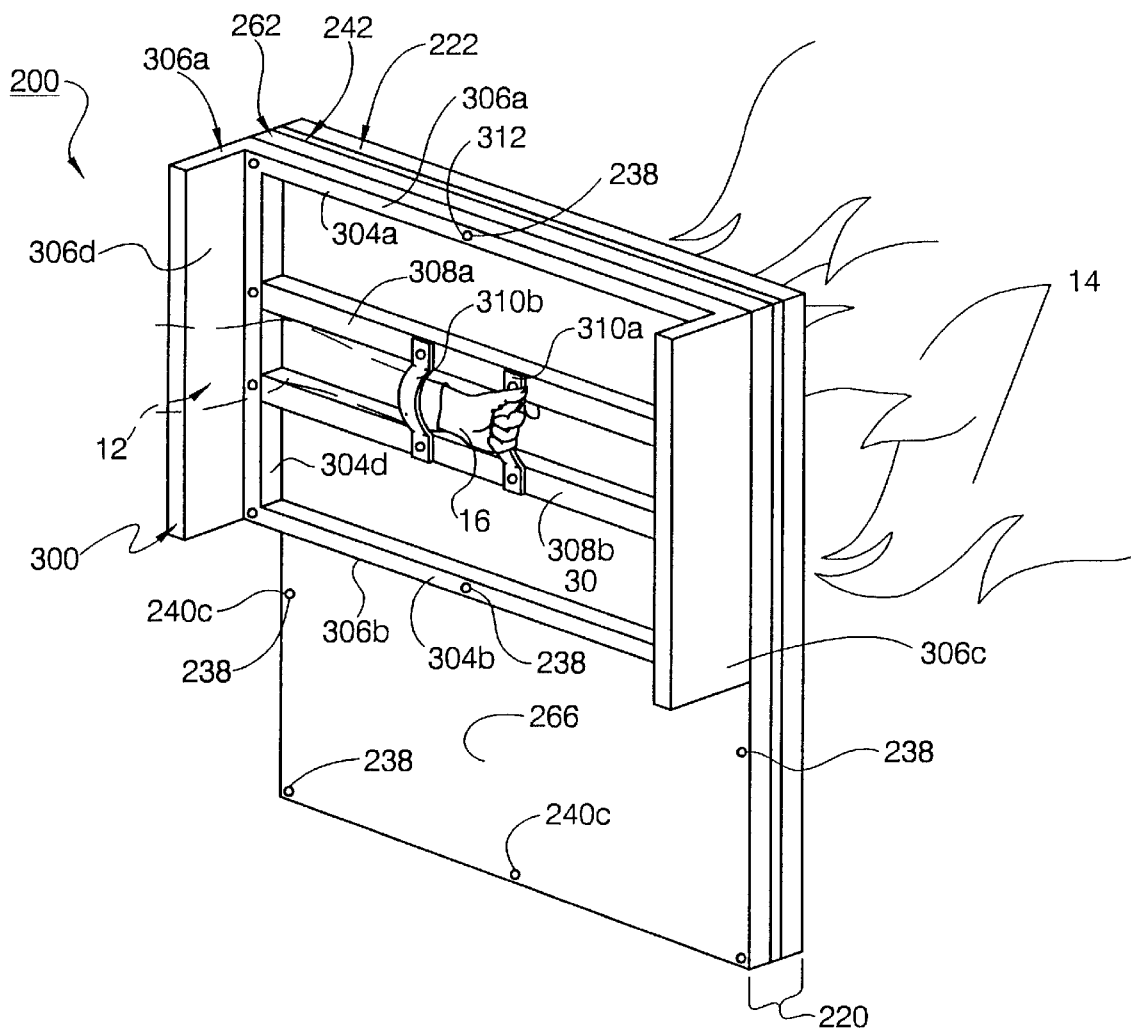
FIG. 9 is a rear perspective view of the fire, heat and backdraft protection shield of the first alternate embodiment of the present invention showing the composite laminate structure in the assembled state having the outer first layer, the inner second layer, the inner third layer and the attachment frame member thereon, and in operational use.

The plurality of layers 220 for the first alternate embodiment 200 includes an outer first layer 222, a second layer 242 and a third layer 262 for the protection of firefighters 12 when in use. The outer first layer 222 is a fiberglass textile having an intumescent coating for resistance to water, fire, heat, impact and backdrafts. The second layer 242 is a metal foil layer for reflecting heat and eliminating the convection transfer of heat. The third layer 262 is a low thermal conductivity refractory blanket for reducing the transmission of heat. Additionally, the fire protection shield 200 includes an attachment frame member 300 with handle components 310a and 310b thereon for holding the plurality of layers 220 together via rivets 238. The attachment frame member 300 is used for holding and attaching the three-ply layered composite laminate structure 220 with each other via rivets 238, as shown in FIG. 9 of the drawings. In all other respects, the fire protection shield 200 of the alternate embodiment functions and operates in the same manner as the fire protection shield 10 of the preferred embodiment.

Figure 15:
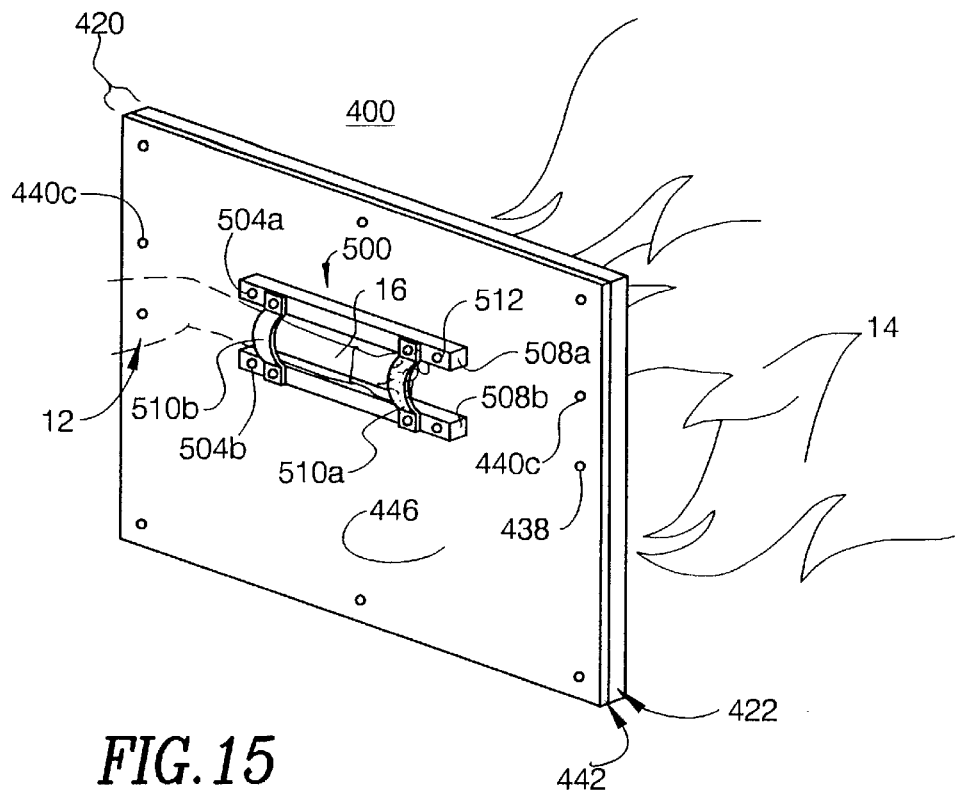
FIG. 15 is a rear perspective view of the fire, heat and backdraft protection shield of the second alternate embodiment of the present invention showing the composite laminate structure in the assembled state having the outer first layer, the inner second layer and the handle assembly thereon, and in operational use.

The plurality of layers 420 for the second alternate embodiment 400 includes an outer first layer 422 and a second layer 442 for the protection of firefighters 12 when in use. The outer first layer 222 is a fiberglass textile having an intumescent coating for resistance to water, ire, heat, impact and backdrafts. The second layer 242 is a metal foil layer for reflecting heat and eliminating the convection transfer of heat. Additionally, the fire protection shield 400 includes a handle assembly 500 having handle members 510a and 510b thereon for holding the plurality of layers 420 together via rivets 438. The handle assembly 500 is used for holding and attaching the two-ply layered composite laminate structure 420 with each other via rivets 438, as shown in FIG. 15 of the drawings. In all other respects, the fire protection shield 400 of the alternate embodiment functions and operates in the same manner as the fire protection shield 10 of the preferred embodiment.

DETAILED DESCRIPTION OF THE PREFERRED EMBODIMENT 10

Figure 1:
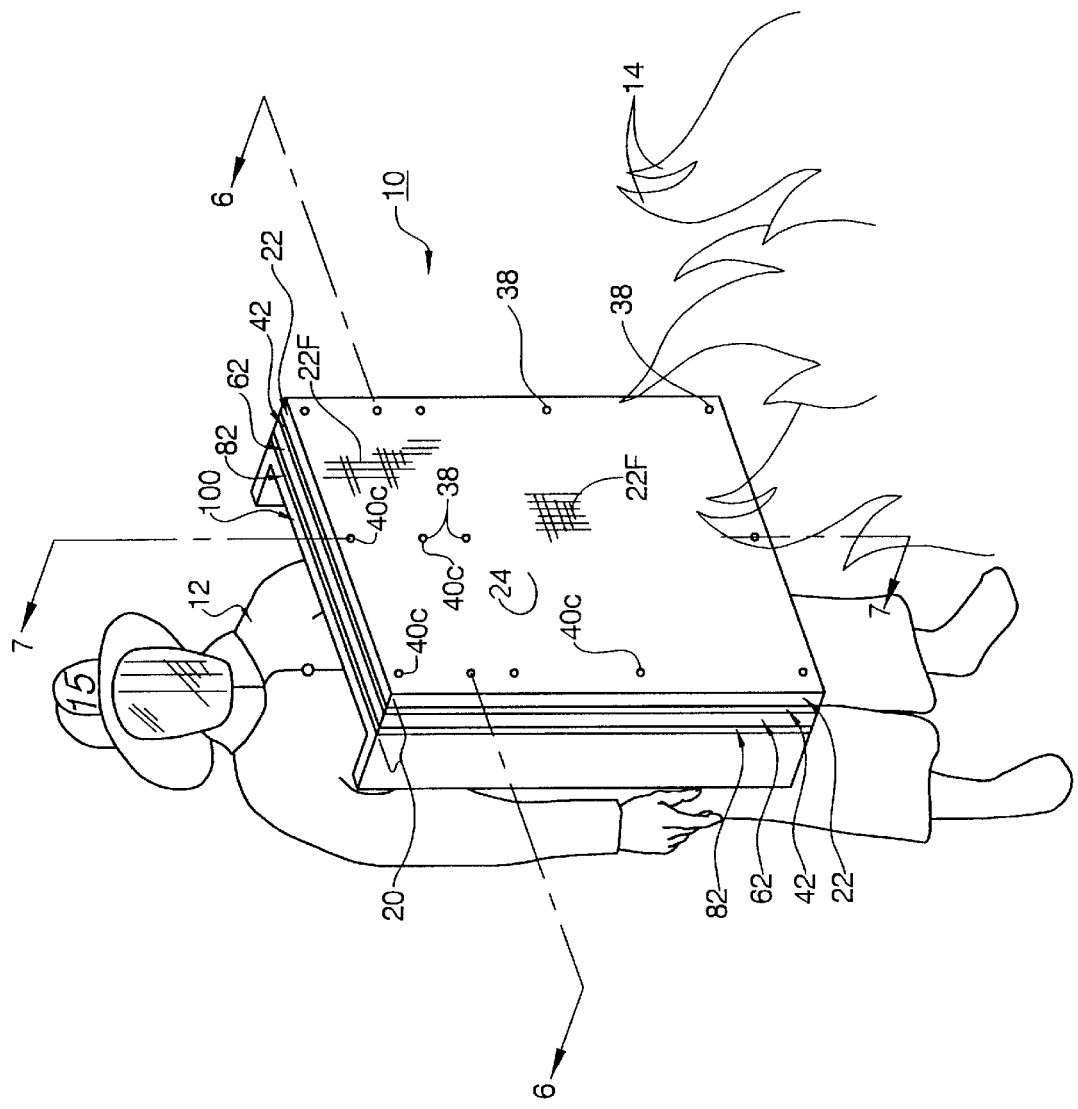
FIG. 1 is a front perspective view of the fire, heat and backdraft protection shield of the preferred embodiment of the present invention showing the composite laminate structure having a plurality of layers in the assembled state for protecting a firefighter from fire, heat flashovers and backdrafts, and in operational use.

The preferred embodiment of the present invention provides for a fire, heat and backdraft protection shield 10 for the protection of a firefighter 12, as depicted in FIGS. 1 to 7 of the drawings. The fire, heat and backdraft protection shield 10, as shown in FIGS. 1 and 2, is formed from a four-ply composite laminate structure 20 having a plurality of layers 22, 42, 62 and 82 which provides the fire, heat and backdraft protection of the firefighter 12. The composite laminate structure 20 includes an outer first layer 22, an inner second layer 42, an inner third layer 62 and an inner fourth layer 82 attached to the attachment frame member 100 having a curved handle component 110.

The outer first layer 22 includes a fiberglass textile having a fire retardant coating 22F, and includes an outer surface wall 24, an inner surface wall 26 and perimeter wall edges 28, 30, 32 and 34. Additionally, the outer first layer 22 includes a plurality of hole openings 36 for receiving therein a plurality of rivets 38, machine screws, metal pins or combinations thereof. In the assembled state, as shown in FIGS. 1, 2, 3 and 5, the outer first layer 22 contacts the inner second layer 42 such that the inner surface wall 26 of the outer first layer 22 is adjacent to and in contact with the outer surface wall 44 of the inner second layer 42. The fire retardant coating 22F on the fiberglass textile is a fire retardant, intumescent coating consisting of a foaming agent, a blowing agent, a charring agent, a binding agent, a solvent and a pigment; flame spread reduction agents, thermal transmission reductive agents, refractory fibers and stabilizers. The intumescent coating also includes mechanical enhancer components for physical impact resistance and adhesion enhancement; water resistance agents and efflorescence reduction agents; and elasticity agents to increase resistance to cracking and shrinking, and to also improve ease of spraying and coating. Thus, the outer first layer 22 of the fiberglass textile layer has intumescent coating 22F for resistance to fire, heat, water, backdrafts, impact, and shrinkage.

Figure 3:
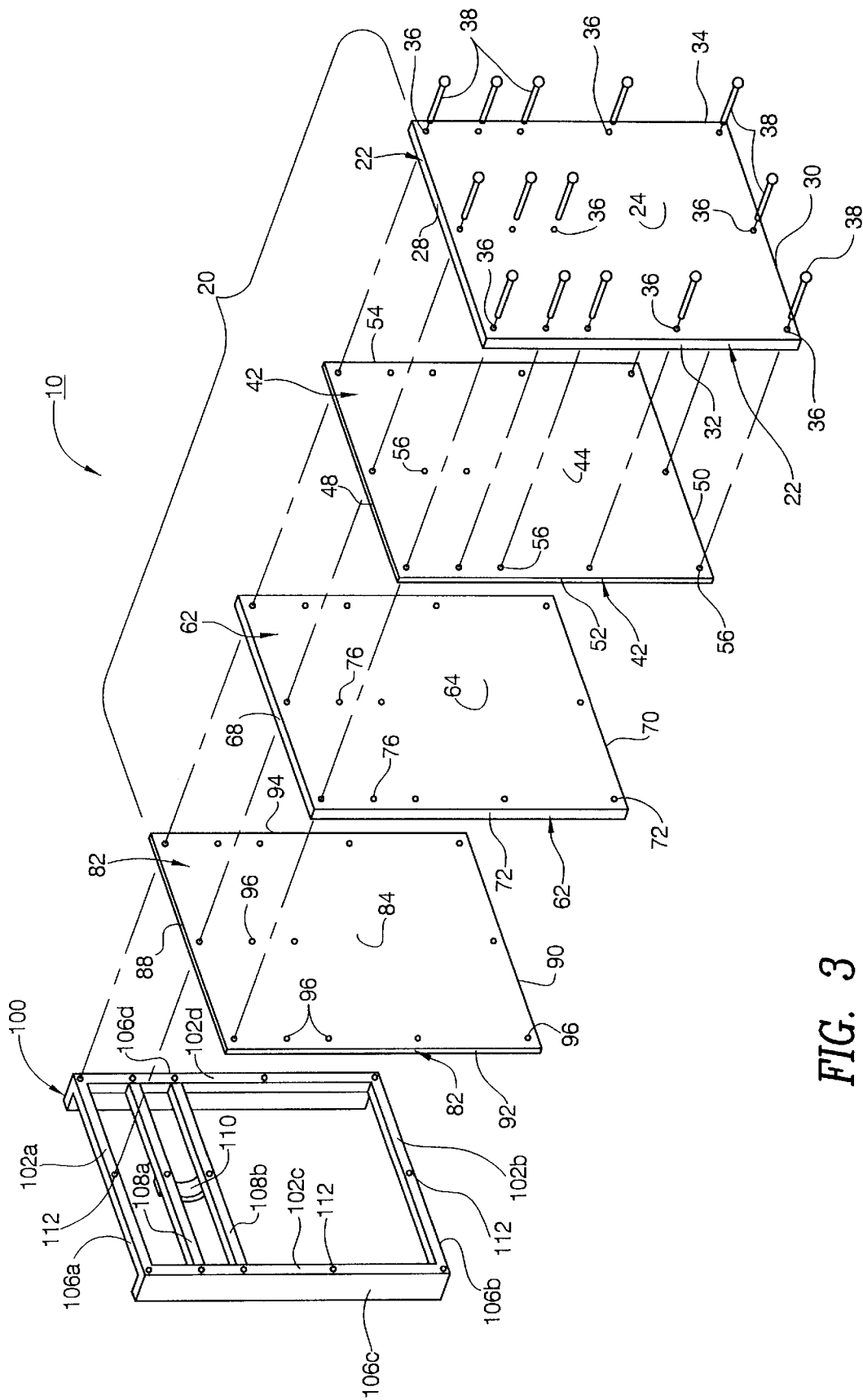
FIG. 3 is an exploded front perspective view of the fire, heat and backdraft protection shield of the present invention showing the four-ply layers of the composite laminate structure in an unassembled state being attached to the attachment frame member via rivets.
Figure 7:
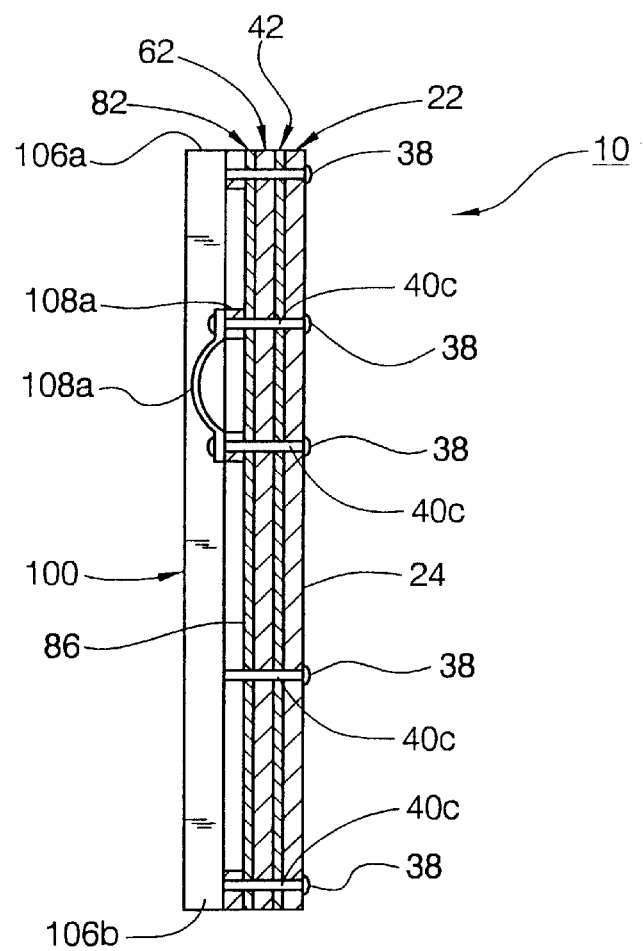
FIG. 7 is a cross-sectional side view of the fire, heat and backdraft protection shield of the present invention taken along lines 7—7 of FIG. 1 showing the composite laminate structure attached to the attachment frame member in the final assembling of the protection shield for operational use.

The inner second layer 42 is a metal foil layer and includes an outer surface wall 44, an inner surface wall 46 and perimeter wall edges 48, 50, 52 and 54. Additionally, the inner second layer 42 includes a plurality of hole openings 56 for receiving therein a plurality of rivets 38. In the assembled state, the inner second layer 42 contacts the inner third layer 62 such that the inner surface wall 46 of the second layer 42 is adjacent to and in contact with the outer surface wall 64 of the inner third layer 62, as shown in FIGS. 1, 3 and 7 of the drawings. The metal foil layer 42 is used for reflecting heat, as a heat reflector, and eliminates the convection transfer of heat from fire. The metal foil layer 42 is made from sheets formed of steel foil, stainless steel foil or aluminum foil.

The inner third layer 62 is a low thermal conductance, refractory blanket layer and includes an outer surface wall 64, an inner surface wall 66 and perimeter wall edges 68, 70, 72 and 74. Additionally, the inner third layer 62 includes a plurality of hole openings 76 for receiving therein a plurality of rivets 38. In the assembled state, the third layer 62 contacts the inner fourth layer 82 such that the inner surface wall 66 of the inner third layer 62 is adjacent to and in contact with the outer surface wall 84 of the inner fourth layer 82, as shown in FIGS. 2, 3 and 7 of the drawings. The low thermal conductance, refractory blanket layer 62 is used for reducing the transmission of heat from the fire. The low thermal conductivity refractory blanket layer 62 is selected from the group consisting of ceramic fiber blankets; silicon dioxide and calcium oxide fiber blankets; high silica fiber blankets; fiber glass blankets; mineral wool; rockwool and equivalents thereof.

The inner fourth layer 82 is a metal foil layer and includes an outer surface wall 84, an inner surface wall 86 and perimeter wall edges 88, 90, 92 and 94. Additionally, the fourth layer 82 includes a plurality of hole openings 96. In the assembled state, the inner fourth layer 82 contacts the attachment frame member 100 such that the inner surface wall 86 of the fourth layer 86 is adjacent to and in contact with the outer front surface walls 102a to 102d of the attachment frame member 100, as shown in FIGS. 1, 3 and 7 of the drawings. The metal foil layer 82 is used for reflecting heat, as a heat reflector, and eliminates the convection transfer of heat from fire. The metal foil layer 82 is made from sheets formed of steel foil, stainless steel foil or aluminum foil.

The attachment frame member 100 includes front outer wall surfaces 102a, 102b, 102c and 102d, rear inner wall surfaces 104a, 104b, 104c and 104d and perimeter wall edges 106a, 106b, 106c and 106d. Frame member 100 also includes a pair of support strut members 108a and 108b for structural support of frame member 100. Strut members 108a and 108b are centrally located and integrally attached to the front outer wall surfaces 102c and 102d, respectively, as shown in FIGS. 3, 4 and 5 of the drawings. Strut members 108a and 108b include a centrally located and integrally attached handle member 110 for holding the heat protection shield 10 by the hand 16 of firefighter 12. Additionally, the front outer wall surfaces 102a to 102b include a plurality of hole openings 112 for receiving therein a plurality of rivets 38. Hole openings 36, 56, 76 and 96 of laminate layers 22, 42, 62, 82, respectively, are aligned together with hole openings 112 of frame member 100, such that rivets 38 are received within the aligned hole openings 36, 56, 76 and 96 and 112 for holding the four-ply layered composite laminate structure 20 to the frame member 100 via rivets 38 to form the assembled heat protection shield 10 of the preferred embodiment of the present invention. Frame member 100 and handle member 110 can be made of light weight metal and heat resistant plastics.

The plurality of layers being the outer first layer 22 and the three inner layers 42, 62 and 82 can be arranged in any order for forming the composite laminate structure 20 for attachment to the attachment frame member 100 via rivets 38.

DETAILED DESCRIPTION OF THE FIRST ALTERNATE EMBODIMENT 200

Figure 8:
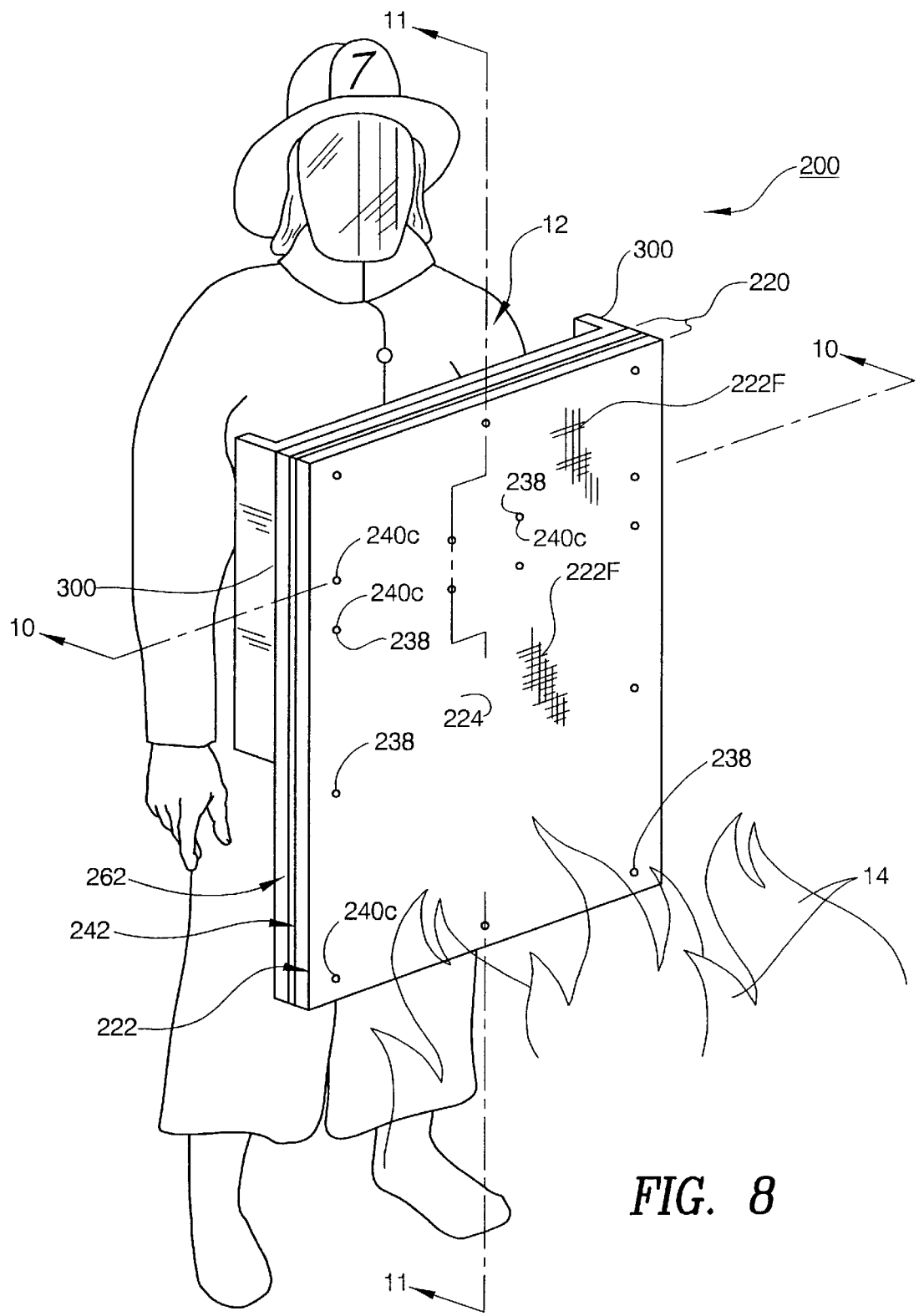
FIG. 8 is a front perspective view of the fire, heat and backdraft protection shield of the first alternate embodiment of the present invention showing the composite laminate structure having a plurality of layers in the assembled state for protecting a firefighter from fire, heat, flashovers and backdrafts, and in operational use.

The first alternate embodiment of the present invention provides for a fire, heat and backdraft protection shield 200 for the protection of a firefighter 12, as depicted in FIGS. 8 to 14 of the drawings. The fire, heat and backdraft protection shield 200, as shown in FIGS. 8 and 9, is formed from a three-ply composite laminate structure 220 having a plurality of layers 222, 242, 262 and 82 which provides the fire, heat and backdraft protection of the firefighter 12. The composite laminate structure 220 includes an outer first layer 222, an inner second layer 242, and an inner third layer 262 attached to the attachment frame member 300 having curved handle components 310a and 310b thereon.

Figure 10:
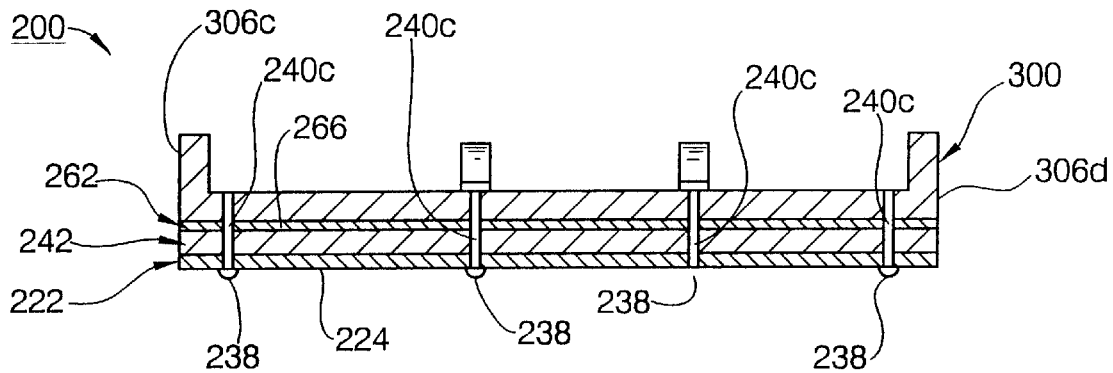
FIG. 10 is a cross-sectional top view of the fire, heat and backdraft protection shield of the first alternate embodiment of the present invention taken along lines 10—10 of FIG. 8 showing the composite laminate structure attached to the attachment frame member in the final assembling of the protection shield for operational use.
Figure 11:
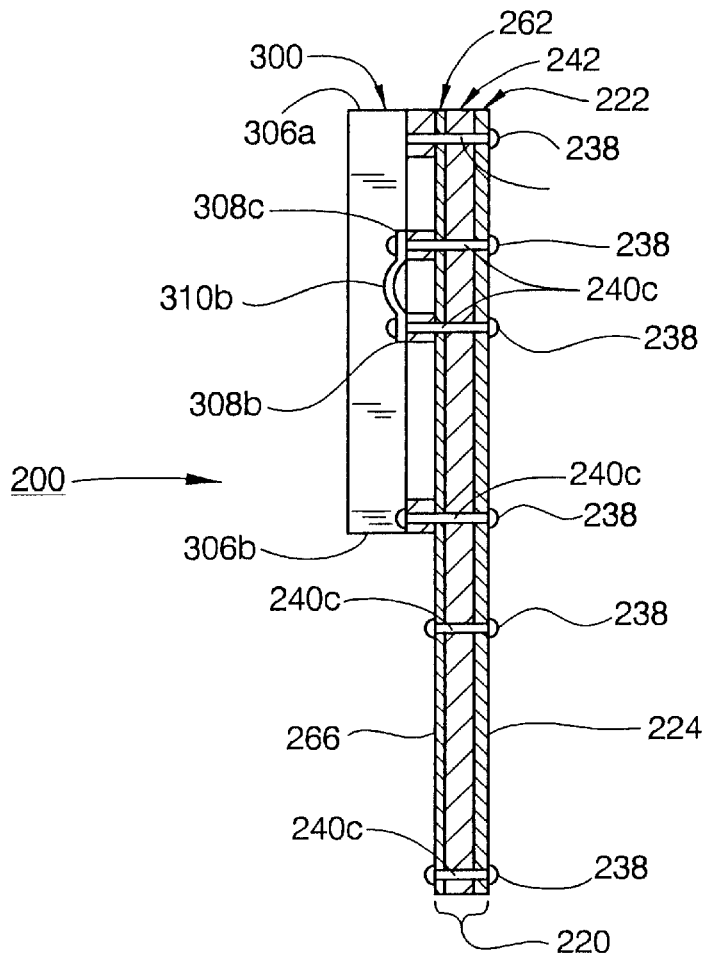
FIG. 11 is a cross-sectional side view of the fire, heat and backdraft protection shield of the first alternate embodiment of the present invention taken along lines 11—11 of FIG. 8 showing the composite laminate structure attached to the attachment frame member in the final assembling of the protection shield for operational use.

The outer first layer 222 includes a fiberglass textile having a fire retardant coating 222F, and includes an outer surface wall 224, an inner surface wall 226 and perimeter wall edges 228, 230, 232 and 234. Additionally, the outer first layer 222 includes a plurality of hole openings 236 for receiving therein a plurality of rivets 238. In the assembled state, as shown in Figures 8, 9 and 10, the outer first layer 222 contacts the inner second layer 242 such that the inner surface wall 226 of the outer first layer 222 is adjacent to and in contact with the outer surface wall 244 of the inner second layer 242. The fire retardant coating 222F on the fiberglass textile is a fire retardant, intumescent coating consisting of a foaming agent, a blowing agent, a charring agent, a binding agent, a solvent and a pigment; flame spread reduction agents, thermal transmission reductive agents, refractory fibers and stabilizers. The intumescent coating also includes mechanical enhancer components for physical impact resistance and adhesion enhancement; water resistance agents and efflorescence reduction agents; and elasticity agents to increase resistance to cracking and shrinking, and to also improve ease of spraying and coating. Thus, the outer first layer 222 of the fiberglass textile layer has intumescent coating 222F for resistance to fire, heat, water, backdrafts, impact, and shrinkage.

The inner second layer 242 is a metal foil layer and includes an outer surface wall 244, an inner surface wall 246 and perimeter wall edges 248, 250, 252 and 254. Additionally, the inner second layer 242 includes a plurality of hole openings 256 for receiving therein a plurality of rivets 238. In the assembled state, the inner second layer 242 contacts the inner third layer 262 such that the inner surface wall 246 of the second layer 242 is adjacent to and in contact with the outer surface wall 264 of the inner third layer 262, as shown in FIGS. 1, 3 and 7 of the drawings. The metal foil layer 242 is used for reflecting heat, as a heat reflector, and eliminates the convection transfer of heat from fire. The metal foil layer 242 is made from sheets formed of steel foil, stainless steel foil or aluminum foil.

Figure 12:
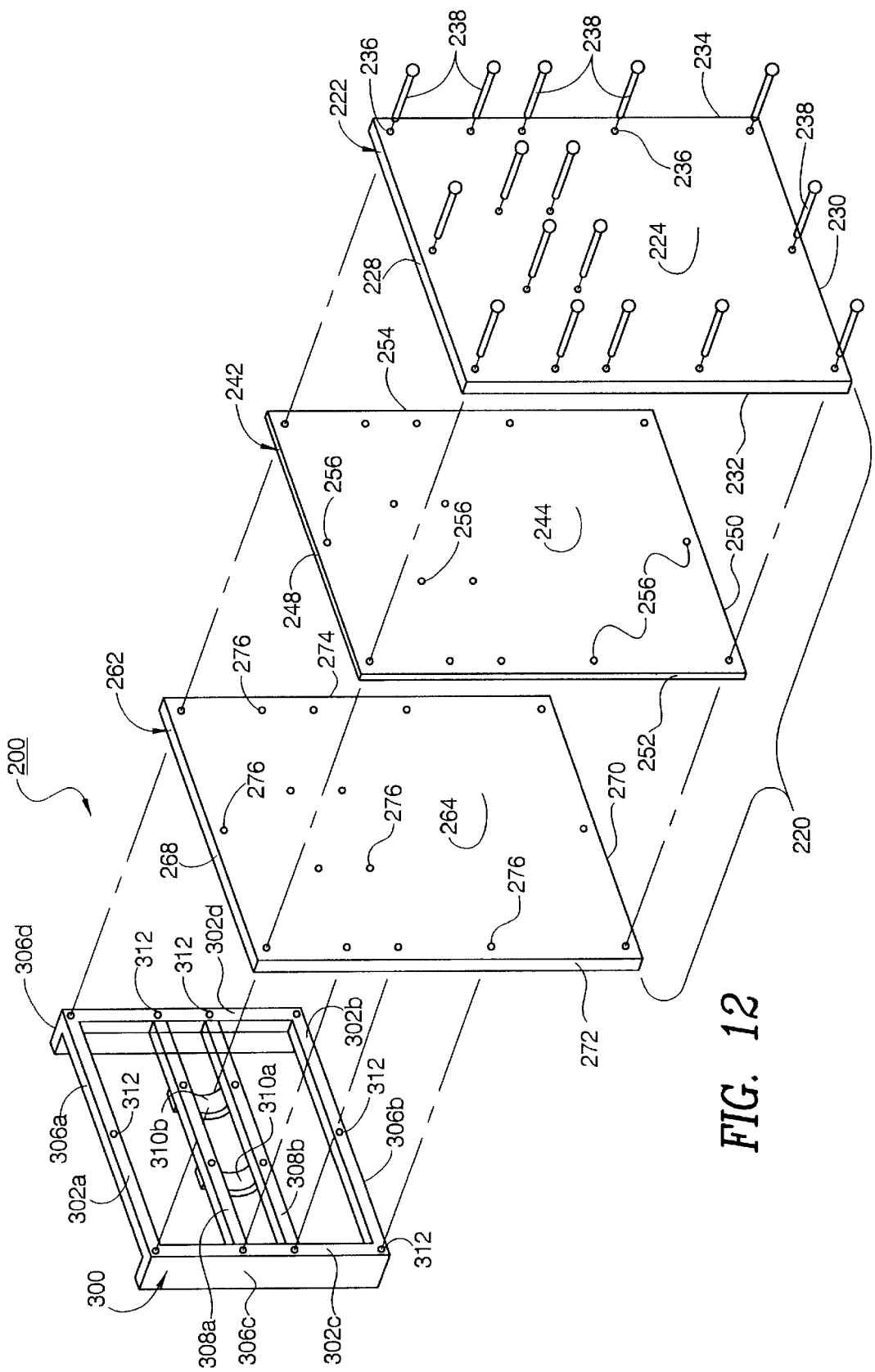
FIG. 12 is an exploded front perspective view of the fire, heat and backdraft protection shield of the present invention showing the three-ply layers of the composite laminate structure in an unassembled state being readied for attachment to the attachment frame member via rivets.

The inner third layer 262 is a low thermal conductance, refractory blanket layer and includes an outer surface wall 264, an inner surface wall 266 and perimeter wall edges 268, 270, 272 and 274. Additionally, the inner third layer 262 includes a plurality of hole openings 276 for receiving therein a plurality of rivets 238. In the assembled state, the inner third layer 262 contacts the inner fourth layer 82 such that the inner surface wall 66 of the inner third layer 62 is adjacent to and in contact with the outer surface walls 302a to 302d of the attachment frame member 300, as shown in FIGS. 12, 13 and 14 of the drawings. The low thermal conductance, refractory blanket layer 262 is used for reducing the transmission of heat from the fire. The low thermal conductivity refractory blanket layer 262 is selected from the group consisting of ceramic fiber blankets; silicon dioxide and calcium oxide fiber blankets; high silica fiber blankets; fiber glass blankets; mineral wool; rockwool and equivalents thereof.

The attachment frame member 300 includes front outer wall surfaces 302a, 302b, 302c and 302d, rear inner wall surfaces 304a, 304b, 304c and 304d and perimeter wall edges 106a, 306b, 306c and 306d. Frame member 300 also includes a pair of support strut members 308a and 308b for structural support of frame member 300. Strut members 308a and 308b are centrally located and integrally attached to the front outer wall surfaces 302c and 302d, respectively, as shown in FIGS. 12, 13 and 14 of the drawings. Strut members 308a and 308b include a centrally located and integrally attached handle members 310a and 310b for holding the heat protection shield 200 by the hand 16 of firefighter 12. Additionally, the front outer wall surfaces 302a to 302b include a plurality of hole openings 312 for receiving therein a plurality of rivets 238. Hole openings 236, 256, 276 and 296 of laminate layers 222, 242, 262, 282, respectively, are aligned together with hole openings 312 of frame member 300, such that rivets 238 are received within the aligned hole openings 236, 256, 276 and 296 and 312 for holding the three-ply layered composite laminate structure 220 to the frame member 300 via rivets 238 to form the assembled heat protection shield 200 of the alternate embodiment of the present invention. Frame member 300 and handle members 310a and 310b can be made of light weight metal and heat resistant plastics.

DETAILED DESCRIPTION OF THE SECOND ALTERNATE EMBODIMENT 400

Figure 16:
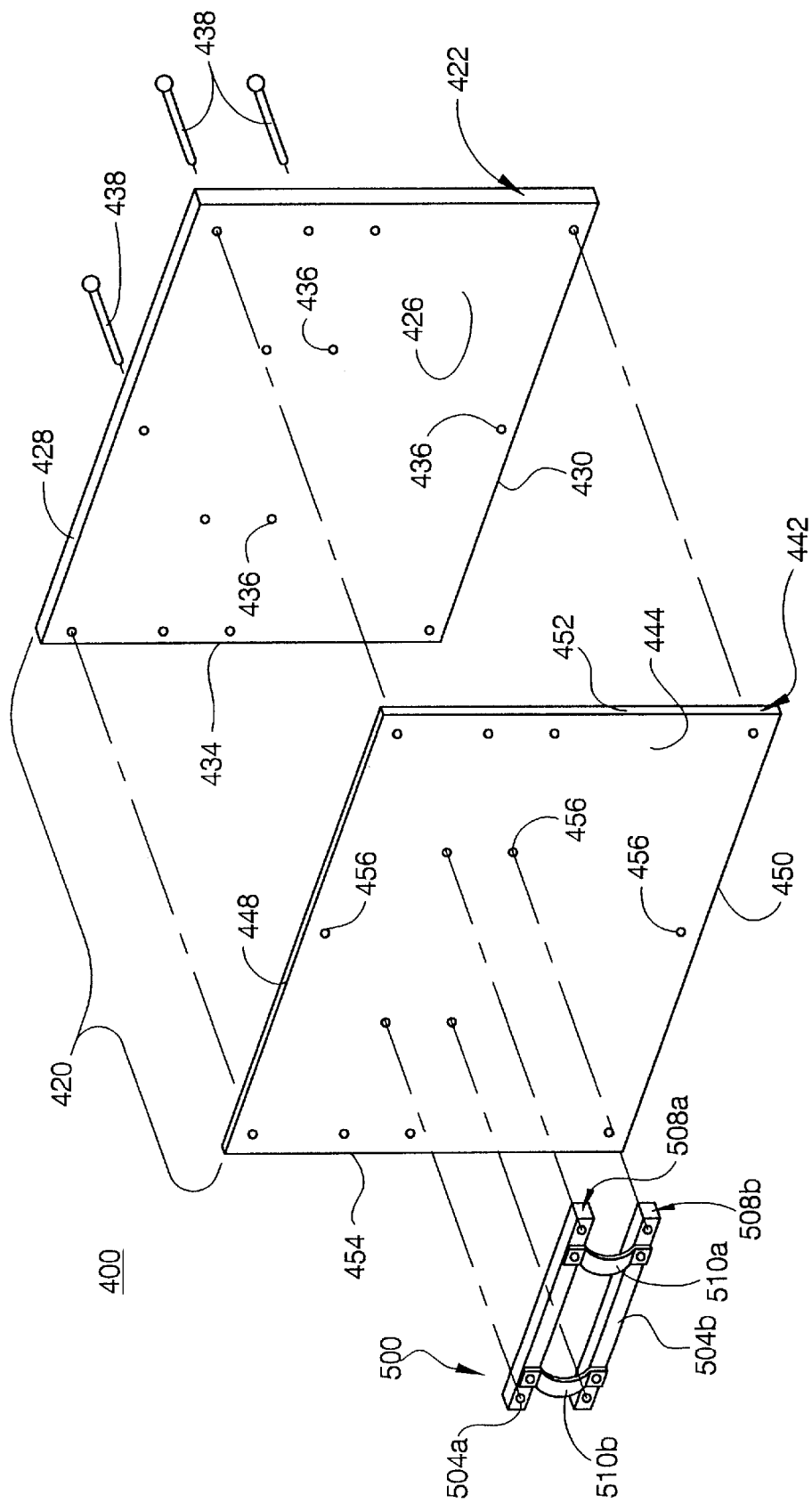
FIG. 16 is an exploded rear perspective view of the fire, heat and backdraft protection shield of the second alternate embodiment of the present invention showing the two-ply layers of the composite laminate structure in an unassembled state being readied for attachment to the handle assembly via rivets.

The second alternate embodiment of the present invention provides for a fire, heat and backdraft protection shield 400 for the protection of a firefighter 12, as depicted in FIGS. 15 to 17 of the drawings. The fire, heat and backdraft protection shield 400, as shown in FIG. 16, is formed from a two-ply composite laminate structure 420 having a plurality of layers 422 and 442 and handle members 510a and 510b, which provides the fire, heat and backdraft protection of the firefighter 12. The composite laminate structure 420 includes an outer first layer 422 and an inner second layer 442 attached to the handle assembly 500 having curved handle components 510a and 510b thereon.

The outer first layer 422 includes a fiberglass textile having a fire retardant coating 422F, and includes an outer surface wall 424, an inner surface wall 426 and perimeter wall edges 428, 430, 432 and 434. Additionally, the outer first layer 422 includes a plurality of hole openings 436 for receiving therein a plurality of rivets 438. In the assembled state, as shown in FIG. 15, the outer first layer 422 contacts the inner second layer 442 such that the inner surface wall 426 of the outer first layer 422 is adjacent to and in contact with the outer surface wall 444 of the inner second layer 442. The fire retardant coating 422F on the fiberglass textile is a fire retardant, intumescent coating consisting of a foaming agent, a blowing agent, a charring agent, a binding agent, a solvent and a pigment; flame spread reduction agents, thermal transmission reductive agents, refractory fibers and stabilizers. The intumescent coating also includes mechanical enhancer components for physical impact resistance and adhesion enhancement; water resistance agents and efflorescence reduction agents; and elasticity agents to increase resistance to cracking and shrinking, and to also improve ease of spraying and coating. Thus, the outer first layer 422 of the fiberglass textile layer has intumescent coating 422F for resistance to fire, heat, water, backdrafts, impact, and shrinkage.

The inner second layer 442 is a metal foil layer and includes an outer surface wall 444, an inner surface wall 446 and perimeter wall edges 448, 450, 452 and 454. Additionally, the inner second layer 442 includes a plurality of hole openings 456 for receiving therein a plurality of rivets 438. In the assembled state, the inner second layer 442 contacts the handle assembly such that the inner surface wall 446 of the second layer 442 is adjacent to and in contact with the outer wall surface 502a to 502d of the handle assembly 500, as shown in FIGS. 16 and 17 of the drawings. The metal foil layer 442 is used for reflecting heat, as a heat reflector, and eliminates the convection transfer of heat from fire. The metal foil layer 442 is made from sheets formed of steel foil, stainless steel foil or aluminum foil.

The attachment handle assembly 500 includes front outer wall surfaces 502a and 502b and rear inner wall surfaces 504a, 504b. Handle assembly 500 also includes a pair of support strut members 508a and 508b for structural support of handle assembly 500. Strut members 508a and 508b are integrally attached to the handle members 510a and 510b for holding the heat protection shield 400 by the hand 16 of firefighter 12, as shown in FIGS. 15 to 17 of the drawings. Additionally, the front outer wall surfaces 502a to 502b include a plurality of hole openings 512 for receiving therein a plurality of rivets 438. Hole openings 436 and 456 of laminate layers 422 and 442, respectively, are aligned together with hole openings 512 of handle assembly, such that rivets 438 are received within the aligned hole openings 436, 456 and 512 for holding the two-ply layered composite laminate structure 420 to the handle assembly 500 via rivets 438 to form the assembled heat protection shield 400 of the second alternate embodiment of the present invention. Handle members 510a and 510b can be made of light weight metal and heat resistant plastics.

EXAMPLES OF USE FOR THE FIRE, HEAT and BACKDRAFT PROTECTION SHIELDS 10, 200 and 400

Example 1
PREFERRED EMBODIMENT 10 HAVING A FOUR-PLY LAYERED COMPOSITE LAMINATE STRUCTURE 20

The fire, heat and backdraft protection shield 10 consists of a composite laminate structure 20 of an outer first layer 22 of NoFire Textile 2025/S1, a second inner layer 42 of 0.002 inch stainless steel foil, a third inner layer 62 of 0.5 inch, 8 lb/cuft density ceramic blanket, and a fourth inner layer 82 of 0.002 inch aluminum foil. This composite laminate structure 20 is installed on one side of an oven. The oven is heated according to the fast rise conditions prescribed by UL1709, for 20 minutes. The temperature of the rear inner wall surface 86 of the fourth inner layer 82 of the protection shield 10 is monitored. The result was an average rear inner wall surface 86 temperature of less than 600° F. for 20 minutes for several temperature trials being measured on the rear inner wall surface 86 of the fourth inner layer 82.

Example 2
PREFERRED EMBODIMENT 10 HAVING A FOUR-PLY LAYERED COMPOSITE LAMINATE STRUCTURE 20

The protection shield 10 described in Example 1 is mounted in a fixture, and orientation similar to the requirements of FAR 25.855. The burner is operated at 30,000 BTU/HR, at a temperature of 2200° F., with a "spot" size of approximately 8 inches. The rear inner wall surface 86 temperature of the protection shield 10 is monitored for 15 minutes. The result was an average rear inner wall surface 86 temperature of less than 220° F. for 15 minutes for several temperature trials being measured on the rear inner wall surface 86 of the fourth inner layer 82.

Example 3
ALTERNATE EMBODIMENT 200 HAVING A THREE-PLY LAYERED COMPOSITE LAMINATE STRUCTURE 220

The fire, heat and backdraft protection shield 200 consists of a composite laminate structure 220 of an outer first layer 222 of NoFire Textile 2025/S1, a second inner layer 242 of 0.002 inch stainless steel foil, and a third inner layer 262 of 0.5 inch, 8 lb/cuft density ceramic blanket. This composite laminate structure 220 is installed on one side of an oven. The oven is heated according to the fast rise conditions prescribed by UL1709, for 20 minutes. The temperature of the rear inner wall surface 266 of the third inner layer 262 of the protection shield 200 is monitored. The result was an average rear inner wall surface 266 temperature of less than 600° F. for 20 minutes for several temperature trials being measured on the rear inner wall surface 266 of the third inner layer 262.

Example 4
ALTERNATE EMBODIMENT 200 HAVING A THREE-PLY LAYERED COMPOSITE LAMINATE STRUCTURE 220

The protection shield 200 described in Example 3 is mounted in a fixture, and orientation similar to the requirements of FAR 25.855. The burner is operated at 30,000 BTU/HR, at a temperature of 2200° F., with a "spot" size of approximately 8 inches. The rear inner wall surface 266 temperature of the protection system 200 is monitored for 15 minutes. The result was an average rear inner wall surface 266 temperature of less than 220° F. for 15 minutes for several temperature trials being measured on the rear inner wall surface 266 of the third inner layer 262.

Example 5
ALTERNATE EMBODIMENT 400 HAVING A TWO-PLY LAYERED COMPOSITE LAMINATE STRUCTURE 420

The fire, heat and backdraft protection shield 400 consists of a composite laminate structure 420 of an outer first layer 422 of No Fire Textile 2025/S1, and a second layer 442 of 0.002 inch stainless steel foil. This composite laminate structure 420 is mounted in a fixture, with orientation similar to the requirements of FAR 25.855. The burner is operated at 30,000 BTU/Hr at a temperature of 2200° F., with a "spot" size of approximately 8 inches. The rear inner wall surface 446 temperature of the protection shield 400 is monitored for 15 minutes. The result was an average rear inner wall surface 446 temperature of less than 460° F. for 15 minutes for several temperature trials being measured on the rear inner wall surface 446 of the inner layer 442.

OPERATION OF THE PRESENT INVENTION

In manufacturing of the protection shield 10 or 200 of the preferred and alternate embodiments of the present invention, the four-ply and three-ply layered composite laminate structures 20 and 220 are pre-assembled by the manufacturer. The composite laminate structures 20 and 220 are then cut to specific width and height dimensions and then hole openings 40c and 240c are drilled through the four-ply and three-ply layered composite laminate structures 20 and 220 at specific locations on the outer surface walls 24 and 224, as depicted in FIGS. 1 and 8 of the drawings, for receiving therein rivets 38 or 238, machine screws or pin and bolt connection means. The hole openings 40C and 240C are then aligned with the hole openings 112 and 312 on the attachment frame member 100 and 300, respectively, such that rivets 38 and 238 are then received within the aligned hole openings 40C and 112; and 240C and 312, respectively, as shown in FIGS. 5 and 14 of the drawings. The rivets 38 and 238 are then peened on each of the rear inner wall surfaces 104a and 104d and 304a to 304, respectively, of attachment frame members 100 and 300 for the forming of the assembled protection shields 10 and 200, respectively. The assembled protection shields 10 and 200 are then delivered to the appropriate fireman and firefighter and can be used with no further assembly required.

In using either the preferred or alternate embodiments 10, 200 or 400 of the present invention in firefighting situations, such as fires 14 of buildings, outdoor fires (forest, brush, grass, etc.), vehicle fires, oil pipeline or gas fires, and chemical fires, the firefighter 12 simply puts his or her hand 16 on the handle member(s) 110, 310a and 310b or 510a and 510b, respectively. The firefighter 12 then lifts the protection shield 10 or 200 to cover his or her body from fire 14, heat, flashovers or backdrafts in the fighting of a particular type of fire 14, (as previously mentioned) as shown in FIGS. 2, 9 and 15 of the drawings. The protection shields 10, 200 and 400 are light weight and do not add to the already burdened firefighter 12 in having any further extraneous equipment to carry.

ADVANTAGES OF THE PRESENT INVENTION

Accordingly, an advantage of the present invention is that it provides for fire, heat and backdraft protection shield for firefighters in fires in houses, buildings, factories, warehouses, airports, off shore drilling platforms, petro chemical facilities and the like which is effective at continuously maintained temperatures up to 2200° F. for up to 30 minutes in duration.

Another advantage of the present invention is that it provides for a fire, heat and backdraft protection shield that is easy to use, and can be used in all types of environments.

Another advantage of the present invention is that it provides for a fire, heat and backdraft protection shield that is relatively thin and light weight, and can easily be transported.

Another advantage of the present invention is that it provides for a fire, heat and backdraft protection shield that is durable, and can be protected against severe environmental conditions of water, impact, temperature fluctuations of extreme hot and cold and humidity.

Another advantage of the present invention is that it provides for a fire, heat and backdraft protection shield that has multiple industry facility applications for operational use that include: buildings; factories; warehouses; homes; coal, gas or oil generating plants; electrical and gas utilities; power generating stations; nuclear power generating facilities; power distribution stations; chemical and pharmaceutical manufacturing facilities; shipping and marine facilities; military installations; telecommunications facilities; airports and the like.

Another advantage of the present invention is that it provides for a fire, heat and backdraft protection shield that includes a novel combination of radiation and heat reflection, low thermal conduction and high heat absorption.

Another advantage of the present invention is that it provides for a fire, heat and backdraft protection shield that includes a composite laminate structure having a plurality of layers for the protection of firefighters.

Another advantage of the present invention is that it provides for a fire, heat and backdraft protection shield that provides a plurality of protection layers including a heat reflection outer shell, an inner reflective lining and an inner low thermal conductive layer attached to a frame.

Another advantage of the present invention is that it provides for a fire, heat and backdraft protection shield that can be easily and mass produced in an automated and economical manner, and is cost efficient for a variety of applications.

Another advantage of the present invention is that it provides for a fire, heat and backdraft protection shield that is non-toxic, non-hazardous, environmentally safe and uses all dry materials with no wet sprays, fibrous materials or airborne particles.

A latitude modification, change and substitution is intended in the foregoing disclosure, and in some instances, some features of the invention will be employed without corresponding use of other features. Accordingly it is appropriate that the appended claims be construed broadly and in a manner consistent with the spirit and scope of the invention herein.

What is claimed is:

1. A protection shield for protecting firefighters from fire, heat, water, impact, flashovers and backdrafts, comprising:
    a) a composite laminate structure having a plurality of layers for protection of firefighters exposed to high temperatures of 2200° F. for 30 minutes in duration;
    b) said plurality of layers including an outer first layer, an inner second layer, an inner third layer, and an inner fourth layer;
    c) said outer first layer being a fiberglass textile having an intumescent coating for resistance to heat, water and impact; and said outer first layer contacting said inner second layer and having an inner surface wall in contact with said inner second layer;
    d) said inner second layer being a metal foil layer for reflecting heat and eliminating the convection transfer of heat; and said inner second layer contacting said inner third layer and having an inner surface wall in contact with said inner third layer;
    e) said inner third layer being a low conductivity refractory blanket for reducing the transmission of heat; and said inner third layer contacting said inner fourth layer and having an inner surface wall in contact with said inner fourth layer; wherein said low conductivity refractory blanket layer is selected from the group consisting of ceramic fiber blankets, silicon dioxide and calcium oxide fiber blankets, silicon dioxide and alumina fiber blankets, high silica fiber blankets, mineral wool blankets, rockwool blankets and equivalents thereof; and
    f) said inner fourth layer being a metal foil layer for reflecting heat and eliminating the convection transfer of heat; said inner fourth layer having an inner surface wall.

2. A protection shield in accordance with claim 1, wherein said intumescent coating is a fire retardant coating consisting of a foaming agent, a blowing agent, a charring agent, a binding agent, a solvent and a pigment; flame spread reduction agents; thermal transmission reducing agents; refractory fibers and stabilizers.

3. A protection shield in accordance with claim 2, wherein said intumescent coating further includes mechanical enhancer components for physical impact resistance and adhesion enhancement; water resistance agents and efflorescence reduction agents; and elasticity agents to increase resistance to cracking and shrinking, and to improve ease of spraying and coating.

4. A protection shield in accordance with claim 1, wherein said metal foil layer is in the form of sheets made from steel foil, stainless steel foil, aluminum foil, copper foil or tantalum foil.

5. A protection shield in accordance with claim 1, wherein said inner second layer is a metal foil layer made of steel foil.

6. A protection shield in accordance with claim 1, wherein said inner second layer is a metal foil layer made of aluminum foil.

7. A protection shield in accordance with claim 1, further including a frame member; and means for connecting said composite laminate structure to said frame member.

8. A protection shield in accordance with claim 7, wherein said composite laminate structure is pre-assembled and formed into a layered sheet composite structure for mounting on said frame member.

9. A protection shield in accordance with claim 7, wherein said frame member further includes one or more handle members for holding said protection shield by a firefighter when in operational use.

10. A protection shield in accordance with claim 7, wherein said frame member is made of light-weight metals or heat resistant plastics.

11. A protection shield in accordance with claim 7, wherein said means for connecting includes a plurality of metal pins, rivets or screws.

12. A protection shield in accordance with claim 1, further including one or more handle members for holding said protection shield by a firefighter when in operational use; and means for connecting said composite laminate structure to said one or more of said handle members.

13. A protection shield in accordance with claim 12, wherein said composite laminate structure is pre-assembled and formed into a layered sheet composite structure for mounting on said one or more of said handle members.

14. A protection shield in accordance with claim 12, wherein one or more of said handle members are made of light-weight metals or heat resistant plastics.

15. A protection shield for protecting firefighters from fire, heat, water, impact, flashovers and backdrafts, comprising:
    a) a composite laminate structure having a plurality of layers for protection of firefighters which are exposed to high temperatures of 2200° F. for 30 minutes in duration;
    b) said plurality of layers including an outer first layer, an inner second layer, and an inner third layer;
    c) said outer first layer being a fiberglass textile having an intumescent coating for resistance to heat, water and impact; and said outer first layer contacting said inner second layer and having an inner surface wall in contact with said inner second layer;
    d) said inner second layer being a metal foil layer for reflecting heat and eliminating the convection transfer of heat; and said inner second layer contacting said inner third layer and having an inner surface wall in contact with said inner third layer; and e) said inner third layer being a low conductivity refractory blanket for reducing the transmission of heat; and said inner third layer having an inner surface wall; wherein said low conductivity refractory blanket layer is selected from the group consisting of ceramic fiber blankets, silicon dioxide and calcium oxide fiber blankets; silicon dioxide and alumina fiber blankets, high silica fiber blankets, mineral wool blankets, rockwool blankets and equivalents thereof.

16. A protection shield in accordance with claim 15, wherein said intumescent coating is a fire retardant coating consisting of a foaming agent, a blowing agent, a charring agent, a binding agent, a solvent and a pigment; flame spread reduction agents; thermal transmission reducing agents; refractory fibers and stabilizers.

17. A protection shield in accordance with claim 16, wherein said intumescent coating further includes mechanical enhancer components for physical impact resistance and adhesion enhancement; water resistance agents and efflorescence reduction agents; and elasticity agents to increase resistance to cracking and shrinking, and to improve ease of spraying and coating.

18. A protection shield in accordance with claim 15, wherein said metal foil layer is in the form of sheets made from steel foil, stainless steel foil, aluminum foil, copper foil or tantalum foil.

19. A protection shield in accordance with claim 15, wherein said inner second layer is a metal foil layer made of steel foil.

20. A protection shield in accordance with claim 15, wherein said inner second layer is a metal foil layer made of aluminum foil.

21. A protection shield in accordance with claim 15, further including a frame member; and means for connecting said composite laminate structure to said frame member.

22. A protection shield in accordance with claim 21, wherein said composite laminate structure is pre-assembled and formed into a layered sheet composite structure for mounting on said frame member.

23. A protection shield in accordance with claim 21, wherein said frame member further includes one or more handle members for holding said protection shield by a firefighter when in operational use.

24. A protection shield in accordance with claim 21, wherein said frame member is made of light-weight metals or heat resistant plastics.

25. A protection shield in accordance with claim 15, further including one or more handle members for holding said protection shield by a firefighter when in operational use; and means for connecting said composite laminate structure to said one or more of said handle members.

26. A protection shield in accordance with claim 25, wherein said composite laminate structure is pre-assembled and formed into a layered sheet composite structure for mounting on said one or more of said handle members.

27. A protection shield in accordance with claim 25, wherein said one or more of said handle members are made of light-weight metals or heat resistant plastics.

28. A protection shield in accordance with claim 15, wherein said means for connecting includes a plurality of metal rivets or a plurality of pin and bolt members, machine screws or combinations thereof.

29. A protection shield in accordance with claim 15, wherein said composite laminate structure forms a curved surface.

30. A shield for protecting firefighters from fire, heat, water, impact, flashovers and backdrafts, comprising:

a) a composite laminate structure having a plurality of layers for the protection of the firefighters which are exposed to high temperatures of 2200° F. for 30 minutes in duration;

b) said plurality of layers including an outer first layer, and three inner layers arranged in any order for forming said composite laminate structure;

c) said outer first layer being a fiberglass textile having an intumescent coating for resistance to heat, water and impact;

d) two of said three inner layers being a metal foil layer for reflecting heat and for eliminating the convection transfer of heat; and e) one of said three inner layers being a low conductivity refractory blanket for reducing the transmission of heat.

31. A protection shield in accordance with claim 30, wherein said intumescent coating is a fire retardant coating consisting of a foaming agent, a blowing agent, a charring agent, a binding agent, a solvent and a pigment; flame spread reduction agents; thermal transmission reducing agents; refractory fibers and stabilizers.

32. A protection shield in accordance with claim 31, wherein said intumescent coating further includes mechanical enhancer components for physical impact resistance and adhesion enhancement; water resistance agents and efflorescence reduction agents; and elasticity agents to increase resistance to cracking and shrinking, and to improve ease of spraying and coating.

33. A protection shield in accordance with claim 30, wherein said metal foil layer is in the form of sheets made from steel foil, stainless steel foil, aluminum foil, copper foil or tantalum foil.

34. A protection shield in accordance with claim 30, wherein said low conductivity refractory blanket layer is selected from the group consisting of ceramic fiber blankets; silicon dioxide and calcium oxide fiber blankets; silicon dioxide and alumina fiber blankets; high silica fiber blankets; fiberglass blankets; mineral wool blankets; rockwool blankets and equivalents thereof.

35. A protection shield in accordance with claim 30, wherein one of said inner layers is a metal foil layer made of steel foil.

36. A protection shield in accordance with claim 30, wherein one of said inner layers is a metal foil layer made of aluminum foil.

37. A protection shield in accordance with claim 30, further including a frame member; and means for connecting said composite laminate structure to said frame member.

38. A protection shield in accordance with claim 37, wherein said composite laminate structure is pre-assembled and formed into a layered sheet composite structure for mounting on said frame member.

39. A protection shield in accordance with claim 37, wherein said frame member further includes one or more handle members for holding said protection shield by a firefighter when in operational use.

40. A protection shield in accordance with claim,37, wherein said frame member is made of light-weight metals or heat resistant plastics.

41. A protection shield in accordance with claim 37, wherein said means for connecting includes a plurality of metal pins, rivets or screws.

42. A protection shield in accordance with claim 30, further including one or more handle members for holding said protection shield by a firefighter when in operational use; means for connecting said composite laminate structure to said one or more of said handle members.

43. A protection shield in accordance with claim 42, wherein said composite laminate structure is pre-assembled and formed into a layered sheet composite structure for mounting on said one or more of said handle members.

44. A protection shield in accordance with claim 42, wherein said one or more of said handle members are made of light-weight metals or heat resistant plastics.

45. A protection shield for protecting firefighters from fire, heat, water, impact, flashovers and backdrafts, comprising:
- a) a composite laminate structure having a plurality of layers for protection of firefighters which are exposed to high temperatures of 2200° F. for 30 minutes in duration;
- b) said plurality of layers including an outer first layer and an inner second layer;
- c) said outer first layer being a fiberglass textile having an intumescent coating for resistance to heat, water and impact; and said outer first layer contacting said inner second layer and having an inner surface wall in contact with said inner second layer; wherein said intumescent coating includes mechanical enhancer components for physical impact resistance and adhesion enhancement; water resistance agents and efflorescence reduction agents; and elasticity agents to increase resistance to cracking and shrinking, and to improve ease of spraying and coating;
- d) said inner second layer being a metal foil layer for reflecting heat and eliminating the convection transfer of heat; and said inner second layer having an inner surface wall;
- e) a frame member; and means for connecting said composite laminate structure to said frame member; and
- f) said frame member includes one or more handle members for holding said protection shield by a firefighter when in operational use.

46. A protection shield in accordance with claim 45, wherein said intumescent coating is a fire retardant coating consisting of a foaming agent, a blowing agent, a charring agent, a binding agent, a solvent and a pigment; flame spread reduction agents; thermal transmission reducing agents; refractory fibers and stabilizers.

47. A protection shield in accordance with claim 45, wherein said metal foil layer is in the form of sheets made from steel foil, stainless steel foil, aluminum foil, copper foil or tantalum foil.

48. A protection shield in accordance with claim 45, wherein said inner second layer is a metal foil layer made of steel foil.

49. A protection shield in accordance with claim 45, wherein said inner second layer is a metal foil layer made of aluminum foil.

50. A protection shield in accordance with claim 45, further including one or more handle members for holding said protection shield by a firefighter when in operational use; and means for connecting said composite laminate structure to said one or more of said handle members.

51. A protection shield in accordance with claim 50, wherein said composite laminate structure is pre-assembled and formed into a layered sheet composite structure for mounting on said one or more of said handle members.

52. A protection shield in accordance with claim 50, wherein said one or more of said handle members are made of light-weight metals or heat resistant plastics.

53. A protection shield in accordance with 45, wherein said composite laminate structure is pre-assembled and formed into a layered sheet composite structure for mounting on said frame member.

54. A protection shield in accordance with claim 45, wherein said frame member is made of light-weight metals or heat resistant plastics.

55. A protection shield in accordance with claim 45, wherein said means for connecting includes a plurality of metal rivets or a plurality of pin and bolt members, machine screws or combinations thereof.

56. A protection shield in accordance with claim 45 wherein said composite laminate structure forms a curved surface.

57. A protection shield in accordance with claim 1, wherein said composite laminate structure forms a curved surface.

* * * * *